(12) United States Patent
Reyes

(10) Patent No.: US 9,129,265 B2
(45) Date of Patent: Sep. 8, 2015

(54) CALL EFFICIENCY INDICATOR

(71) Applicant: Florida Power & Light Company, Juno Beach, FL (US)

(72) Inventor: George E. Reyes, Miami, FL (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 0 days.

(21) Appl. No.: 14/142,794

(22) Filed: Dec. 28, 2013

(65) Prior Publication Data

US 2014/0185789 A1    Jul. 3, 2014

Related U.S. Application Data

(60) Provisional application No. 61/747,507, filed on Dec. 31, 2012.

(51) Int. Cl.
*H04M 3/00*     (2006.01)
*G06Q 10/10*    (2012.01)
*H04M 3/51*     (2006.01)
*G06Q 10/06*    (2012.01)

(52) U.S. Cl.
CPC ........ *G06Q 10/1091* (2013.01); *G06Q 10/0639* (2013.01); *H04M 3/5175* (2013.01)

(58) Field of Classification Search
CPC . H04M 3/5175; H04M 3/523; H04M 3/5238; H04M 3/5232
USPC .......................... 379/265.06, 265.08, 266.03
See application file for complete search history.

(56) References Cited

U.S. PATENT DOCUMENTS 6,044,355 A * 3/2000 Crockett et al. ............. 705/7.39
2006/0239440 A1* 10/2006 Shaffer et al. ............ 379/265.02

* cited by examiner

*Primary Examiner* — Rasha Al Aubaidi
(74) *Attorney, Agent, or Firm* — Feldman Gale, PA; Rafael Perez-Piñeiro; Matthew Horowitz

(57) ABSTRACT

Disclosed is a computer-implemented method for providing a call efficiency indicator. The method includes determining an agent scheduled time for a call efficiency indicator period; determining a number of calls handled by the agent for each particular call type during the call efficiency indicator period; calculating the average time it took that agent to handle calls, on a call type basis and during the call efficiency indicator period; determining an Average Handle Time metric; calculating idle time for the agent for the call efficiency indicator period; and calculating the call efficiency indicator for the call efficiency indicator period as a function of the number of calls handled by the agent, the Average Handle Time, the idle time, and the agent scheduled time.

8 Claims, 5 Drawing Sheets

CEI Example $$CEI = \frac{\text{Number of Calls Handled}}{\left(\frac{\text{Agent Scheduled Time (sec.)} - \text{Agent Idle Time (sec.)}}{\text{Average Handle Time (sec.)}}\right)}$$

Assumptions:
Number of Calls handled = 97
Agent Scheduled Time = 27,000 Seconds
Agent Idle Time = 810 Seconds
Average Handle Time = 280 Seconds Calculation:

$$CEI = 97 / ((27{,}000-810)/280) = 103.7\%$$

Call Efficiency Indicator (CEI)

$$CEI = \frac{\text{Number of Calls Handled}}{\left(\frac{\text{Agent Scheduled Time (sec.)} - \text{Agent Idle Time (sec.)}}{\text{Average Handle Time (sec.)}}\right)}$$

*Number of Calls Handled* - The number of calls that an Agent answers.

*Agent Scheduled Time* - The amount of time that an Agent is scheduled to work and take calls.

*Agent Idle Time* - The amount of time an Agent is waiting to answer a call.

*Average Handle Time* - The amount of time an Agent's peers take on average to handle the same call type.

FIG. 2

CEI Example $$\text{CEI} = \frac{\text{Number of Calls Handled}}{\left(\dfrac{\text{Agent Scheduled Time (sec.)} - \text{Agent Idle Time (sec.)}}{\text{Average Handle Time (sec.)}}\right)}$$

Assumptions:

- Number of Calls handled = 97
- Agent Scheduled Time = 27,000 Seconds
- Agent Idle Time = 810 Seconds
- Average Handle Time = 280 Seconds Calculation:

$$\text{CEI} = 97 / ((27{,}000 - 810)/280) = 103.7\%$$

FIG. 3

$$CEI \ \frac{\text{Number of Calls Handled}}{(\text{Agent Scheduled Time} - \text{Agent Idle Time}) / \text{Average Handle Time}}$$

EXAMPLE:

Agent Schedule:
    Start      End
    8:00 AM  5:00 PM

Breaks: Two 15 minute breaks
    Lunch:  One 60 minute break

Agent Scheduled Time:

450 minutes or 27,000 seconds ( 9 hours - 30 minutes in breaks - 60 minute lunch )

Agent Idle Time: ( Time spent logged in waiting for a call to be delivered )

60 minutes or 3,600 seconds

Average Handle Time: ( BUDGET )

| Call Type | Budget AHT | Agent AHT | Agent Calls Handled | |
|---|---|---|---|---|
| Credit | 190 | 195 | 60 | 11400 |
| Sales | 290 | 300 | 39 | 11310 |
| Total | | 236.4 | 99 | 22710 |

CEI:

| | | |
|---|---|---|
| Numerator | 99 | Agent Call Handled |
| Denominator | 27000 | Scheduled Seconds |
| | 3600 | Idle Seconds |
| | 229.4 | What Agent's AHT should have been Calculation ((190*60)+(290*39))/99 |
| | 102.0 | Calculation (27000-3600)/229.4 |
| CEI = | 97.1% | Calculation (99/102.0) |

Fig. 5

CALL EFFICIENCY INDICATOR

CROSS REFERENCE TO RELATED APPLICATIONS

This application claims the benefit of U.S. Provisional Application No. 61/747,507 filed Dec. 31, 2012, the entirety of which is hereby incorporated by reference.

BACKGROUND

1. Field of the Invention

The invention relates generally to call centers or other call processing systems in which voice calls, e-mails, faxes, voice messages, text messages, Internet service requests and other types of communications are distributed among a number of service agents for handling. More particularly, the invention relates to a system and method for determining the efficiency of a customer service agent or representative.

2. Description of the Related Art

Call centers provide a wide array of services for customers of the companies that use the call centers. Through a call center, a company can service customers around the world, around the clock. High performance of the call center service representatives or agents that serve the calling customers is crucial to achieve call center effectiveness and efficiency. Call center supervisors manage call service representatives and are responsible for monitoring their performance. Call center supervisors may monitor service representatives' calls for various reasons, including, to provide training to the customer service representatives, to assure the quality of customer service, and to maintain security within the company.

For a call center that uses an automatic call distributor (ACD), private branch exchange (PBX), or other suitable call routing device, there are typical features that are integral to the ACD which enable the monitoring of service representative performance. These capabilities, however, are generally manual and have significant limitations. For example, the out of the box reports and metrics available are limited and do not really give a supervisor the information they need to understand how an agent is performing.

With other demands on their time and attention, supervisors may not be consistent or equitable in the ways that they monitor each agent. These inconsistencies and inequities may result in a supervisor monitoring an agent either for too little time or too much time; too infrequently or too frequently. This may cause an imbalance in the supervisor's perception of an agent relative to other agents in the call center.

Another problem that manual scheduling and monitoring of agents causes is increased time pressure on the supervisors themselves. For example, they must remember who has been monitored, for how long they have monitored or intend to monitor an agent, and when to monitor the agent. If a call center has numerous service representatives, the requirement to monitor the performance of these agents may seriously and adversely affect the productivity of the call center supervisor. This is because the task of monitoring agents is only one of many tasks that the supervisor must perform.

In light of the problems pointed out above, there is a need in the art for a system that analyzes agent performance by providing an accurate measurement of an agent's productivity and call handling efficiency, the results of which may be used to improve a customer service agent or representative productivity.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Disclosed is a computer-implemented method for providing a call efficiency indicator. The method includes determining an agent scheduled time for a call efficiency indicator period; determining a number of calls handled by the agent for each particular call type during the call efficiency indicator period; calculating the average time it took that agent to handle calls, on a call type basis and during the call efficiency indicator period; determining an Average Handle Time metric; calculating idle time for the agent for the call efficiency indicator period; and calculating the call efficiency indicator for the call efficiency indicator period as a function of the number of calls handled by the agent, the Average Handle Time, the idle time, and the agent scheduled time. The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIGS. 2, 3 and 5 illustrate exemplary calculations of a call efficiency indicators.

DESCRIPTION OF ILLUSTRATIVE EMBODIMENTS

Figure 1:
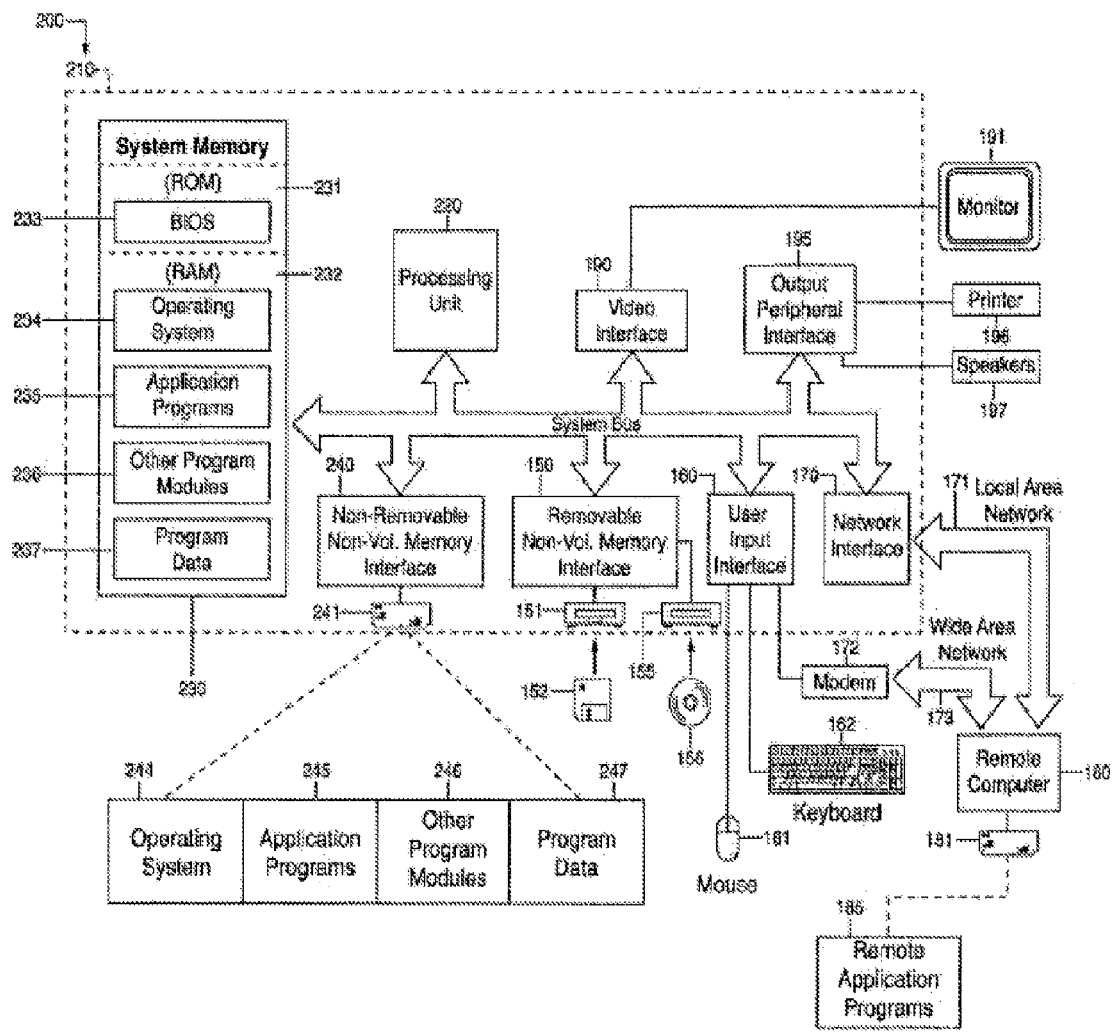
FIG. 1 illustrates an example of a suitable computing system environment on which features of the disclosed concept may be implemented in accordance with one embodiment of the invention.

As used herein, an element or step recited in the singular and proceeded with the word "a" or "an" should be understood as not excluding plural of said elements or steps, unless such exclusion is explicitly stated. In this document, the term "or" is used to refer to a nonexclusive or, unless otherwise indicated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the following detailed description, reference is made to drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be implemented as a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to illustrations of methods, systems, and computer program products according to embodiments of the invention. It will be understood that blocks of the illustrations, and combinations of blocks in the illustrations, can be implemented by computer program instructions, hardware devices, or a combination of both. These computer program instructions may be provided to a processor of a general purpose computer, special purpose computer, or other programmable data processing apparatus to produce a particular machine, such that the instructions, which execute via the processor of the computer or other programmable data processing apparatus, implement the functions specified in the block or blocks.

Embodiments of present invention may be implemented on one or more computing devices, including one or more servers, one or more client terminals, including computer terminals, a combination thereof, or on any of the myriad of computing devices currently known in the art, including without limitation, personal computers, laptops, notebooks, tablet computers, touch pads (such as the Apple iPad, SmartPad Android tablet, etc.), multi-touch devices, smart phones, personal digital assistants, other multi-function devices, stand-alone kiosks, etc. An exemplary computing device for implementing a computational device is illustrated in FIG. 1.

FIG. 1 illustrates an example of a suitable computing system environment 200 on which features of the invention may be implemented. The computing system environment 200 is only one example of a suitable computing environment and is not intended to suggest any limitation as to the scope of use or functionality of the invention. Neither should the computing environment 200 be interpreted as having any requirement relating to any one or combination of components illustrated in the exemplary operating environment 200.

The invention is operational with numerous other computing system environments or configurations. Examples of well known computing systems, environments, and/or configurations that may be suitable for use with the invention include, but are not limited to, personal computers, server computers, hand-held, notebook or laptop devices, touch pads, multi-touch devices, smart phones, other multi-function devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by one or more computing devices. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system that may be used for implementing the invention includes a computing device 210 which may be used for implementing a client, server, mobile device or other suitable environment for the invention. Components of computing device 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computing device 210 typically includes a variety of computer readable media. Computer readable media may be defined as any available media that may be accessed by computing device 210 and includes both volatile and nonvolatile media, removable and non-removable media. By way of example, and not limitation, computer readable media may include computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computing device 210. Combinations of the any of the above should also be included within the scope of computer readable media.

The system memory 230 may include computer storage media in the form of volatile and/or nonvolatile memory such as read only memory (ROM) 231 and random access memory (RAM) 232. A basic input/output system 233 (BIOS), containing the basic routines that help to transfer information between elements within computing device 210, such as during start-up, is typically stored in ROM 231. RAM 232 typically contains data and/or program modules that are immediately accessible to and/or presently being operated on by processing unit 220. By way of example, and not limitation, FIG. 1 illustrates operating system 234, application programs 235, other program modules 236, and program data 237.

The computing device 210 may also include other removable/non-removable, volatile/nonvolatile computer storage media. By way of example only, FIG. 1 illustrates a hard disk drive 240 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing device 210. In FIG. 1, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 20 through input devices such as a keyboard 162 and pointing device 161, commonly referred to as a mouse, trackball, touch screen, or multi-touch input device. Other input devices (not shown) may include a microphone, joystick, game pad, satellite dish, scanner, movement sensor device such as the Microsoft Kinect or the like. These and other input devices are often connected to the processing unit 220 through a user input interface 160 that is coupled to the system bus, but may be connected by other interface and bus structures, such as a parallel port, game port or a universal serial bus (USB). A monitor 191 or other type of display device may also be connected to the system bus 221 via an interface, such as a video interface 190. In addition to the monitor, computers may also include other peripheral output devices such as speakers 197 and printer 196, which may be connected through an output peripheral interface 195.

The computing device 210 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computing device 210, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computing device 210 is connected to the LAN 171 through a network interface or adapter 170. When used in a WAN networking environment, the computer 210 typically includes a modem 172 or other means for establishing communications over the WAN 173, such as the Internet. The modem 172, which may be internal or external, may be connected to the system bus 221 via the user input interface 160, or other appropriate mechanism. In a networked environment, program modules depicted relative to the computing device 210, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Use of the system of the present invention results in an improved methodology for measuring a call agent's productivity. In accordance with one embodiment of the present invention, a formula is applied to calculate a call efficiency indicator ("CEI") that measures a customer service representative's ability to handle an inbound customer call within the target length, measured in seconds, while taking into account variances in the type of calls handled.

In one embodiment, the CEI may be calculated by a reporting system made up of various databases as follows:

(Total Calls Handled)/((Agent's Scheduled Minutes–Idle Time)/Average Handle Time).

The Agent's Scheduled Time is the amount of time an Agent is scheduled to work and take calls. Agent Idle time is the amount of time the Agent is waiting to answer a call. The average handle time may be defined as either the amount of time an Agent's peers take on average to handle the same call type or the amount of time an Agent should have taken based on a budgeted average handle time.

The denominator in the formula above i.e., (Agent's Scheduled Minutes–Idle Time)/Target Handle Time, may be characterized as the number of calls that an agent should have handled.

The CEI may be used, as illustrated in FIG. 2, in order to incorporate the number of calls handled as a performance measurement. The call mix AHT is based on various call types that an Agent handles. The Agent idle time is system generated based on the amount of time an agent is waiting to handle a call.

FIGS. 3 and 5 illustrate examples of CEI calculations. These calculations may be implemented through the algorithm illustrated in FIG. 4.

Figure 4:
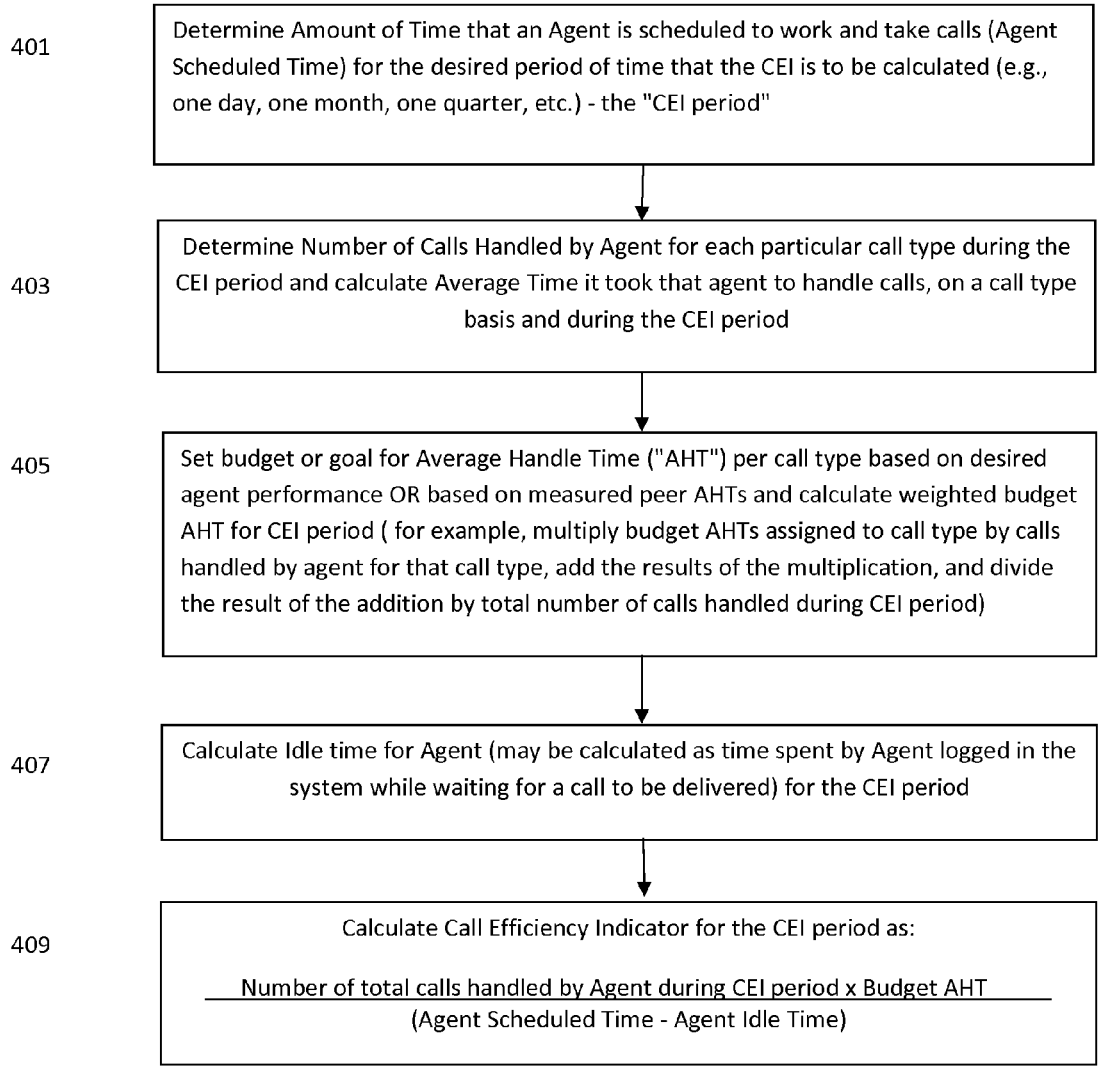
FIG. 4 illustrates a flowchart of the method of the present invention in accordance with one embodiment.

The method in FIG. 4, a method for calculating CEI is illustrated. Step 401 includes determining an Amount of Time that an Agent is scheduled to work and take calls (Agent Scheduled Time) for the desired period of time that the CEI is to be calculated (e.g., one day, one month, one quarter, etc.)—the "CEI period." Step 403 includes determining Number of Calls Handled by Agent for each particular call type during the CEI period and calculate the Average Time it took that agent to handle calls, on a call type basis and during the CEI period. Step 405 includes setting a budget or goal for Average Handle Time ("AHT") per call type based on desired agent performance or based on measured peer AHTs and calculate weighted budget AHT for the CEI period (for example, multiply budget AHTs assigned to call type by calls handled by agent for that call type, add the results of the multiplication, and divide the result of the addition by total number of calls handled during CEI period). Step 407 includes calculating Idle time for the Agent (may be calculated as time spent by Agent logged in the system while waiting for a call to be delivered) for the CEI period. Step 409 includes calculating the CEI for the CEI period.

The various embodiments and/or components, for example, the modules, elements, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of executing the functions described herein. The above examples are exemplary only, and are thus not intended to limit in any way the definition and/or meaning of the term "computer."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software", "firmware" and "algorithm" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation to the teachings of the invention without departing from its scope. While the dimensions, types of materials and coatings described herein are intended to define the parameters of the invention, they are by no means limiting and are exemplary embodiments. Many other embodiments will be apparent to those of skill in the art upon reviewing the above description.

The foregoing description of possible implementations consistent with the present invention does not represent a comprehensive list of all such implementations or all variations of the implementations described. The description of only some implementation should not be construed as an intent to exclude other implementations. For example, artisans will understand how to implement the invention in many other ways, using equivalents and alternatives that do not depart from the scope of the invention. Moreover, unless indicated to the contrary in the preceding description, none of the components described in the implementations are essential to the invention. It is thus intended that the embodiments disclosed in the specification be considered as illustrative, with a true scope and spirit of the invention being indicated by the following claims.

The invention claimed is:

1. A computer-readable non-transitory storage medium containing a data server application, which when executed on a processor is configured to perform an operation providing a call efficiency indicator, the operation comprising:
   determining an agent scheduled time for a call efficiency indicator period;
   determining a number of calls handled by said agent for each particular call type during the call efficiency indicator period;
   calculating the average time it took that agent to handle calls, on a call type basis and during the call efficiency indicator period;
   determining an Average Handle Time metric;
   calculating idle time for the agent for the call efficiency indicator period; and
   calculating the call efficiency indicator for the call efficiency indicator period as a function of said number of calls handled by said agent, said Average Handle Time, said idle time, and said agent scheduled time as follows:

$$CEI = \frac{\text{Number of total calls handeled by Agent during } CEI \text{ period} \times AHT}{(\text{Agent Scheduled Time} - \text{Agent Idle})}.$$

2. The computer-readable non-transitory storage medium of claim 1, wherein the Average Handle Time is determined on a per call type basis.

3. The computer-readable non-transitory storage medium of claim 1, wherein the Average Handle Time is determined for all call types.

4. The computer-readable non-transitory storage medium of claim 2, wherein the Average Handle Time is determined as the amount of time said agent's peers take on average to handle the same call type.

5. The computer-readable non-transitory storage medium of claim 1, wherein the Average Handle Time is determined as the amount of time an agent should have taken to handle calls on average based on a budgeted average handle time.

6. The computer-readable non-transitory storage medium of claim 1, wherein determining the agent's scheduled time comprises determining the amount of time that an agent is scheduled to work and take calls.

7. The computer-readable non-transitory storage medium of claim 1, wherein calculating idle time for the agent comprises calculating time spent by said agent logged in while waiting for a call to be delivered.

8. The computer-readable non-transitory storage medium of claim 1, wherein the call efficiency indicator period comprises approximately one day, one month, one quarter, or one year.

* * * * *